(12) United States Patent
Kwatra et al.

(10) Patent No.: US 10,891,954 B2
(45) Date of Patent: Jan. 12, 2021

(54) METHODS AND SYSTEMS FOR MANAGING VOICE RESPONSE SYSTEMS BASED ON SIGNALS FROM EXTERNAL DEVICES

(71) Applicant: INTERNATIONAL BUSINESS MACHINES CORPORATION, Armonk, NY (US)

(72) Inventors: Shikhar Kwatra, Durham, NC (US); Jeremy Fox, Georgetown, TX (US); Paul Krystek, Highland, NY (US); Sarbajit Rakshit, Kolkata (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 111 days.

(21) Appl. No.: 16/239,290

(22) Filed: Jan. 3, 2019

(65) Prior Publication Data

US 2020/0219496 A1    Jul. 9, 2020

(51) Int. Cl.
*G10L 15/22* (2006.01)
*G10L 15/30* (2013.01)
*G10L 25/78* (2013.01)

(52) U.S. Cl.
CPC .............. *G10L 15/22* (2013.01); *G10L 15/30* (2013.01); *G10L 25/78* (2013.01); *G10L 2015/223* (2013.01)

(58) Field of Classification Search
CPC ... G10L 15/20; G10L 15/22; G10L 2015/223; G10L 21/06; G10L 21/10; G10L 15/02; G10L 15/265; G10L 15/32; G10L 2015/225; G10L 2021/02161; G10L 2021/02165; G10L 21/0208; G10L 21/0264; G10L 21/034; G10L 25/06; G10L 25/48; G10L 25/51; G10L 25/78; G10L 25/84; G10L 13/033; G10L 17/00; G10L 17/22; G10L 17/24; G10L 15/26; G10L 15/08; G10L 15/30; G10L 13/00; G10L 17/02; G10L 17/04; G10L 17/20; G10L 2015/088; G10L 2015/227; G10L 25/15; G10L 15/01; G10L 17/06

See application file for complete search history.

(56) References Cited

U.S. PATENT DOCUMENTS

| | | | |
|---|---|---|---|
| 6,289,309 B1 | 9/2001 | DeVries | |
| 8,615,392 B1 | 12/2013 | Goodwin | |
| 9,558,755 B1 | 1/2017 | Laroche | |
| 2005/0275558 A1 | 12/2005 | Papadimitriou et al. | |
| 2007/0154031 A1 | 7/2007 | Avendano et al. | |
| 2012/0010881 A1 | 1/2012 | Avendano et al. | |
| 2014/0330560 A1* | 11/2014 | Venkatesha | G10L 15/26 704/235 |
| 2015/0025881 A1 | 1/2015 | Avendano et al. | |
| 2016/0063997 A1 | 3/2016 | Nemala et al. | |
| 2016/0284349 A1* | 9/2016 | Ravindran | G10L 15/20 |

\* cited by examiner

*Primary Examiner* — Huyen X Vo
(74) *Attorney, Agent, or Firm* — Griffiths & Seaton PLLC

(57) ABSTRACT

Embodiments for managing a voice response system by one or more processors are described. At least one sound is detected. A signal that is representative of at least a portion of the at least one detected sound is received. A voice communication is determined based on the at least one detected sound and the signal. A response to the determined voice communication is determined.

18 Claims, 6 Drawing Sheets

METHODS AND SYSTEMS FOR MANAGING VOICE RESPONSE SYSTEMS BASED ON SIGNALS FROM EXTERNAL DEVICES

BACKGROUND OF THE INVENTION

Field of the Invention

The present invention relates in general to computing systems, and more particularly, to various embodiments for managing voice response systems based on signals received from external devices.

Description of the Related Art

Voice response systems (e.g., artificial intelligence (AI) voice response systems, virtual assistants, chatbots, interactive agents, Artificial Conversational Entities (ACEs), etc.), are computer nodes (i.e., devices and/or programs) or artificial intelligence modules which are able to conduct conversations with individuals (or users) through auditory (e.g., speech/voice) methods (and/or in some instances, text-based methods). Such programs are often designed to convincingly simulate how humans behave as conversational partners. As such, users may ask questions, and the system answers (or responds) based on its knowledge base, performing a search (e.g., online search), and/or by analyzing the question, providing the best answer it can generate. Additionally, some voice response systems may be used to perform various types of actions, such as controlling computing devices/nodes and "internet of things" (IoT) devices and performing online transactions, in response to received commands and/or requests.

In some circumstances, such as in "noisy" environments and/or with competing, background noises/sounds (e.g., a vacuum cleaner, other conversations, etc.), voice response systems may have difficulty understanding voiced communications. In such situations, the system may not be able to perform the desired action.

SUMMARY OF THE INVENTION

Various embodiments for managing voice response systems by one or more processors are described. In one embodiment, by way of example only, a method for managing a voice response system, again by one or more processors, is provided. At least one sound is detected. A signal that is representative of at least a portion of the at least one detected sound is received. A voice communication is determined based on the at least one detected sound and the signal. A response to the determined voice communication is determined.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
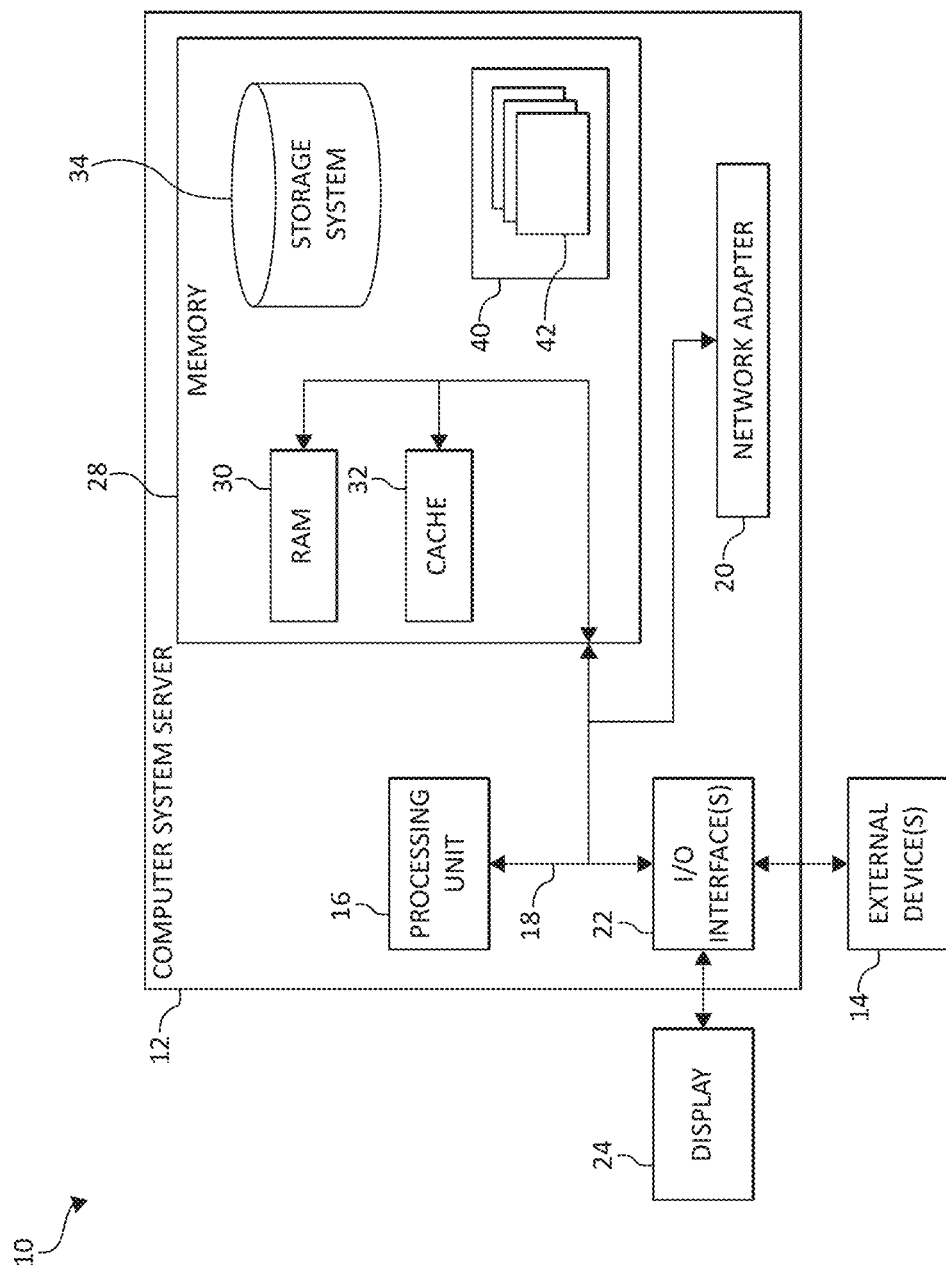
FIG. 1 is a block diagram depicting an exemplary computing node according to an embodiment of the present invention.

As discussed above, voice response systems (e.g., artificial intelligence (AI) voice response systems, virtual assistants, chatbots, interactive agents, Artificial Conversational Entities (ACEs), etc.), are computer nodes (i.e., devices and/or programs) or artificial intelligence modules which are able to conduct conversations with individuals (or users) through auditory (e.g., speech/voice) methods (and/or in some instances, text-based methods). Such programs are often designed to convincingly simulate how humans behave as conversational partners. As such, users may ask questions, and the system answers (or responds) based on its knowledge base, performing a search (e.g., online search), and/or by analyzing the question, providing the best answer it can generate. Additionally, some voice response systems may be used to perform various types of actions, such as controlling computing devices/nodes and "internet of things" (IoT) devices and performing online transactions, in response to spoken/voice commands and/or requests.

In some circumstances, such as in "noisy" environments and/or with competing, background noises/sounds (e.g., a vacuum cleaner, other conversations, etc.), voice response systems may have difficulty understanding voice communications (e.g., commands or questions). In such situations, the system may not be able to perform the desired action without some remedial action by the user, such as silencing other devices or speaking the commands (or questions) at an increased volume (e.g., shouting, yelling, etc.) to essentially improve the "signal to noise ratio."

For example, consider a scenario in which a user is providing a voice communication (e.g., a command or question) to a chatbot while using a vacuum cleaner. Because of the noise typically generated by such a device, in order for the system to be able to hear (or detect) and/or understand (or correctly process) the communication, the user may have to momentarily stop using (e.g., turn off) the vacuum cleaner or shout the communication.

As another example, consider a scenario in which a chatbot detects a voice command that is not (directly) generated by a human. For example, a chatbot may detect human speech being generated by an entertainment system (e.g., a television or sound/music system), which it may undesirably interpret as a voice command. However, in other scenarios, it may be desirable for a human voice generated by a device (e.g., a computing device) to be able to provide voice commands, such as when a user is interacting with a chatbot remotely (e.g., during a conference or video call).

As such, current voice response systems (or chatbots) typically lack some desirable features and/or functionality. For example, current systems are not able to identify competing/background sounds generated by various types of devices. Current systems are also not able to remove (or filter) competing sounds in such a way to allow the desired voice commands to be separated or isolated from the other sounds.

Thus, there is a need for improved voice response systems that can effectively be used in noisy environments and/or environments that include non-human or device-generated sounds.

To address these needs, in some embodiments described herein, methods and systems are provided for managing voice response systems (or chatbots) and/or the operation thereof such that the systems may be more effectively used in noisy environments and/or environments that include device-generated sounds. In some embodiments, dynamic connections with and/or signals (e.g., electronic signals) received from noise generating devices are utilized to essentially separate or filter undesired or background sounds from desired voice communications provided by users. In some embodiments, the chatbot systems may be better able to discern voice commands in environments with excessive unwanted, background noise without the need for the user to silence noise-generating devices, shout commands, and/or move closer to the chatbot system (i.e., the microphone utilized by the chatbot).

In some embodiments, the chatbot system is connected to and/or receives a signal from one of more noise-generating devices (e.g., via wireless communication, near-field communication, etc.) to distinguish sounds (e.g., linguistic or non-linguistic) generated thereby from human-generated sounds (e.g., voices). Examples of such devices include, for example, televisions, audio/music systems, appliance, various types of computing devices, "internet of things" (IoT) devices, etc. The received signals are used to remove (or filter) the sounds generated by the respected devices from the audio feed and/or detected/received voice communications (e.g., commands or questions) detected by the microphone(s) utilized by the chatbot.

In some embodiments, confirmation of the user's identity and/or the presence of the source of a detected human-generated sound within the vicinity of the chatbot (e.g., in the same room as the chatbot) is performed via a video feed and/or camera (e.g., a camera on a computing device or a stand alone camera in the room/vicinity). Such may be used to improve the confidence of the system. In some embodiments, if the confidence is determined to be above a predetermined (e.g., user defined) threshold, the chatbot performs the determined/appropriate response to the received voice communication. However, if the confidence is below the threshold, the system may generate a notification and provide it to the user (e.g., via a computing device, such as a mobile phone or dedicated control module for the chatbot), which includes a question or requests a clarification regarding the voice communication.

For example, consider an environment in which voices are generated by a television (e.g., a movie being shown on the television) in a vicinity (e.g., within the same room) of a chatbot, while a user in the vicinity provides a voice command, both of which are detected by the chatbot. In some embodiments, the chatbot receives a signal from the television (or an associated computing system) and uses the signal to validate the voice/spoken content rendered by the television. The chatbot (or another computing system) uses such to discern the voice content rendered by the television from the voice command provided by the user. A camera feed (e.g., from a camera located in the vicinity) may be used to match the voice command to the user (e.g., to check if the user is speaking/spoke and/or his/her mouth moved).

In some embodiments, feature matching and voice extraction is performed using a Mel-frequency cepstral (MFC) algorithm and/or using Mel-frequency cepstral coefficients (MFCCs). As is commonly understood, MFCCs are derived from a type of cepstral representation of the audio clip (i.e., a nonlinear "spectrum-of-a-spectrum"). The difference between the cepstrum and the Mel-frequency cepstrum is that in the MFC, the frequency bands are equally spaced on the mel scale, which approximates the human auditory system's response more closely than the linearly-spaced frequency bands used in the normal cepstrum. This frequency warping may allow for better representation of sound, for example, in audio compression.

In some embodiments, video-based user validation may be performed and/or utilized. For example, if a voice command is provided by a remote user, such as a user interacting with the chatbot via a conference call or video call, the system may validate the voice command with the device (e.g., the computing device being utilized for the conference/video call) to determine if the voice is from an authorized user (e.g., a remote authorized user) or from another source (e.g., a television program, movie, music, etc.). In this way, the system may be capable of distinguishing the remote user's voice command from sounds generated by spurious sources.

As a more specific example, consider a scenario in which a local user is engaged in and/or taking part in a video call with a remote user while a television is on in the background. During the video call, the remote user provides a voice command (or asks a question of the chatbot). In response, the system may communicate/interface with the television and/or the system being used for the video call (e.g., a computing device) to gain an understanding of the current circumstances in the vicinity (i.e., that a video call is in progress and a television is on). If the system determines that the received voice command was (or is) generated by a user (e.g., the remote user) engaged in the video call, and not a sound generated by the television, the voice command may be executed. Otherwise, the system may ignore and/or not execute the voice command. In this way, the system may distinguish between various video/audio activities occurring at the same time in the vicinity of the chatbot.

In some embodiments, noise detection and nullification is utilized. That is, if sound in a non-linguistic format is detected, such as at the same time a voice command is provided and/or detected, the system may determine if the sound is from any nearby device or machine and/or if it is being generated by a sound system, television, etc. If the sound is determined to be from a device/machine, the system may filter out the sound to facilitate the discerning of the voice command.

For example, the system may be trained to recognize sound typically generated by specific devices (e.g., a vacuum cleaner, electric can opener, garage door opener, lawn mower, etc.). If such a sound is detected, the sound may be filtered out and/or the system may cause the device (e.g., an IoT device) to be (temporarily) silenced or shut down when a voice command is detected, until the voice command is clearly understood/appropriately processed.

In some embodiments, noise "color" validation and defined nullification thereof is utilized. That is, if the system is able to validate specific elements and types of "colors" within a sound environment spectrum, the system may be able to properly nullify the identified sound. For example, the system may be trained to detect and recognize various types of colors within the spectrum of audible sounds. If the system is able to identify the sounds, the system may then be trained to nullify (or filter out) the different colors with the spectrum of sounds. In this regard, as is commonly understood, in audio engineering, electronics, physics, and many other fields, the color of noise refers to the power spectrum of a noise signal (i.e., a signal produced by a stochastic process). Different colors of noise have significantly different properties. For example, as audio signals they will sound different to human ears, and as images they will have a visibly different texture. Therefore, each application typically requires noise of a specific color. This sense of color for noise signals is similar to the concept of timbre in music (which is sometimes referred to as "tone color").

In some embodiments, a cognitive analysis may be used to perform the voice command (or voice response system) management described herein. In some embodiments, the cognitive analysis includes analyzing various data sources associated with the voice command, the individual making the voice command, and/or the situational condition(s) in which the voice command is given. The data sources may include, for example, a historical record of interactions between the user and the voice response system (e.g., previous commands, previous actions taken in response to the commands, etc.), a profile (e.g., cognitive profile) of the user, and/or a detected situational condition (or surrounding context) associated with the individual (e.g., determined utilizing cameras, speakers, microphones, the detected presence/operation of computing devices, etc.). Profiles (e.g., cognitive profiles) for users may be generated based on any appropriate data sources associated with the users that are accessible by the system (perhaps with the permission or authorization of the user). Examples of such data sources include, but are not limited to, computing systems/devices/nodes (e.g., IoT devices) associated with the user, communication sessions and/or the content (or communications) thereof (e.g., phone calls, video calls, text messaging, emails, in person/face-to-face conversations, etc.), a profile of (or basic information about) the user (e.g., job title, place of work, length of time at current position, family role, age, etc.), a schedule or calendar (i.e., the items listed thereon, time frames, etc.), projects (e.g., past, current, or future work-related projects), location (e.g., previous and/or current location and/or location relative to other users), social media activity (e.g., posts, reactions, comments, groups, etc.), browsing history (e.g., web pages visited), and online purchases.

The cognitive analysis may also include classifying natural language, analyzing tone, and analyzing sentiment (e.g., scanning for keywords, key phrases, etc.) with respect to, for example, communications sent to and/or received/detected by voice response systems. In some embodiments, Mel-frequency cepstral coefficients (MFCCs) and natural language processing (NLP) may be used. Over time, the methods and systems described herein may determine correlations (or insights) between communications (e.g., voice commands) received by voice response systems and actions associated with the communications, perhaps with feedback provided by the users, that allows for the performance of the system to improve with continued use.

As such, in some embodiments, the methods and/or systems described herein may utilize a "cognitive analysis," "cognitive system," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, the management of voice response system operation as described herein. Utilizing the models, the performance (or operation) of the system (e.g., utilizing/based on new inputs) may be predicted and/or the performance of the system may be optimized by investigating how changes in the input(s) effect the output(s).

It should be understood that as used herein, the term "computing node" (or simply "node") may refer to a computing device, such as a mobile electronic device or a desktop computer, and/or an application, such a voice response system, an email application, a social media application, a web browser, etc. In other words, as used herein, examples of computing nodes include, for example, computing devices such as mobile phones, tablet devices, desktop computers, or other devices, such as appliances (IoT appliances) that are owned and/or otherwise associated with individuals (or users), and/or various applications that are utilized by the individuals on such computing devices.

In some embodiments, methods and systems are provided that enable voice response systems to discern a user (or voice) command in a noisy environment without, for example, silencing other noise generating devices or the user increasing their voice signal to the system. The methods and systems may utilize the identification of competing sounds via direct feed from sound generating devices using, for example, wireless or near-field communications. Competing sounds may be removed or filtered from the direct audio feed to separate the user voice commands from the other sounds, thereby facilitating the processing and/or understanding of the voice commands. The identification of a type of sound color within a vast array of an audible sound spectrum environment and the nullification thereof may be utilized.

Linguistic voice commands generated from surrounding devices (e.g., televisions, music systems, recordings of the user's device, etc.) may be distinguished from live spoken content generated by individuals present in the vicinity (either via physical location or remote via phone/video call). The participation of devices (e.g., IoT devices) may be utilized to distinguish spoken command content from sounds generated by the devices. The system may distinguish between recorded voice and video conference voice commands from other sounds. Sounds generated by devices/machines in the vicinity may be distinguished from same, or similar, sounds generated from recorded sound or from remote video conferencing.

In particular, in some embodiments, a method for managing a voice response system by one or more processors is provided. At least one sound is detected. A signal that is representative of at least a portion of the at least one detected sound is received. A voice communication is determined based on the at least one detected sound and the signal. A second signal that is representative of the determined voice communication may be generated.

A response to the determined voice communication may be determined. The response may be caused to be executed by a computing device. The determined response may include at least one of adjusting the operation of the computing device and generating a reply communication to the determined voice communication.

The at least one detected sound may include a human generated sound and a non-human generated sound. The signal and the non-human generated sound may be generated by an external device. The signal may be representative of the non-human generated sound.

The determining of the voice communication may include filtering the at least one detected sound based on the signal. The at least one detected sound may include a non-human generated sound that includes the determined voice communication.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc., and/or any other computing node utilizing a voice response system and/or in/through which a voice response system may be implemented. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
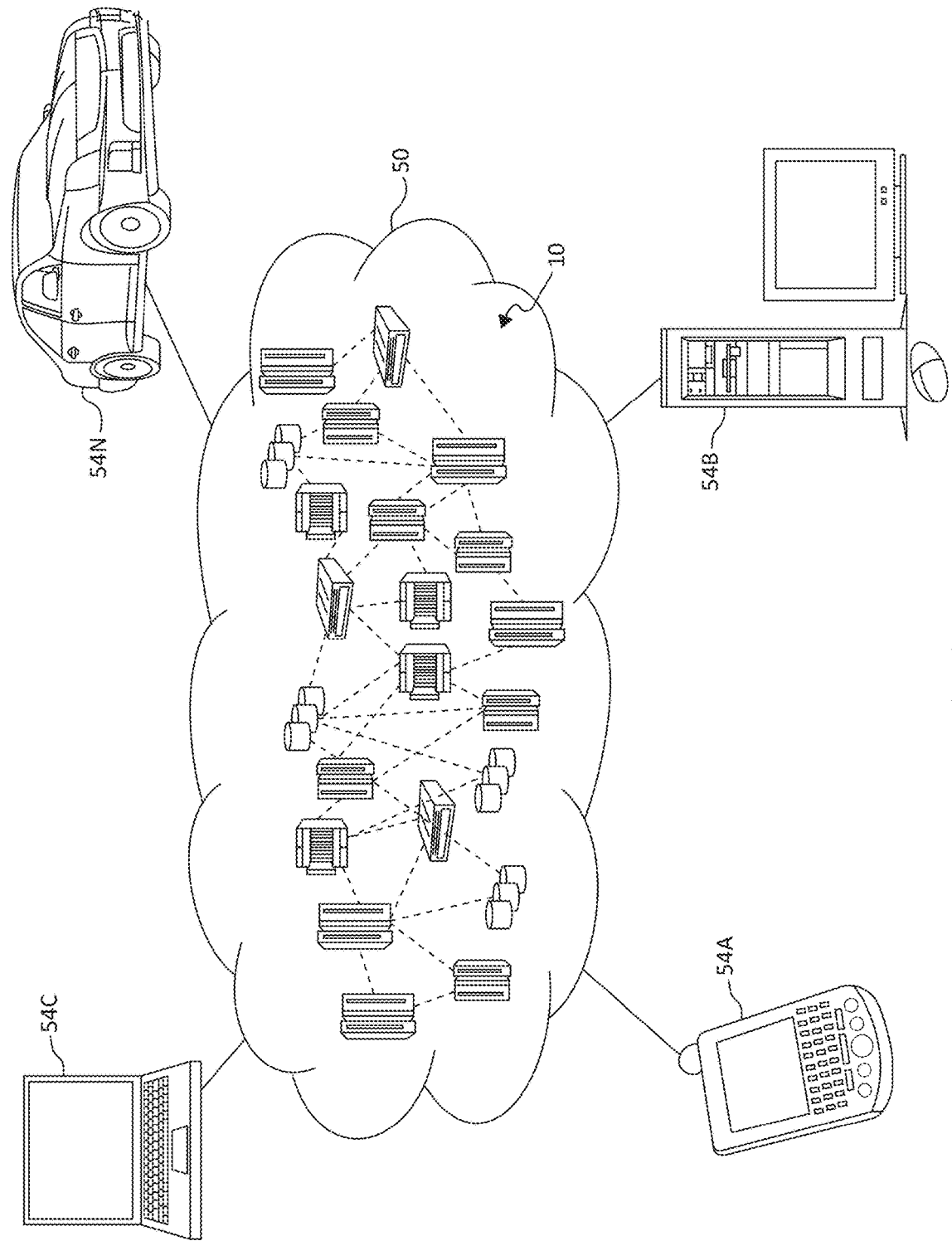
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular (or mobile) telephone or PDA 54A, desktop computer 54B, laptop computer 54C, and vehicular computing system (e.g., integrated within automobiles, aircraft, watercraft, etc.) 54N, may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
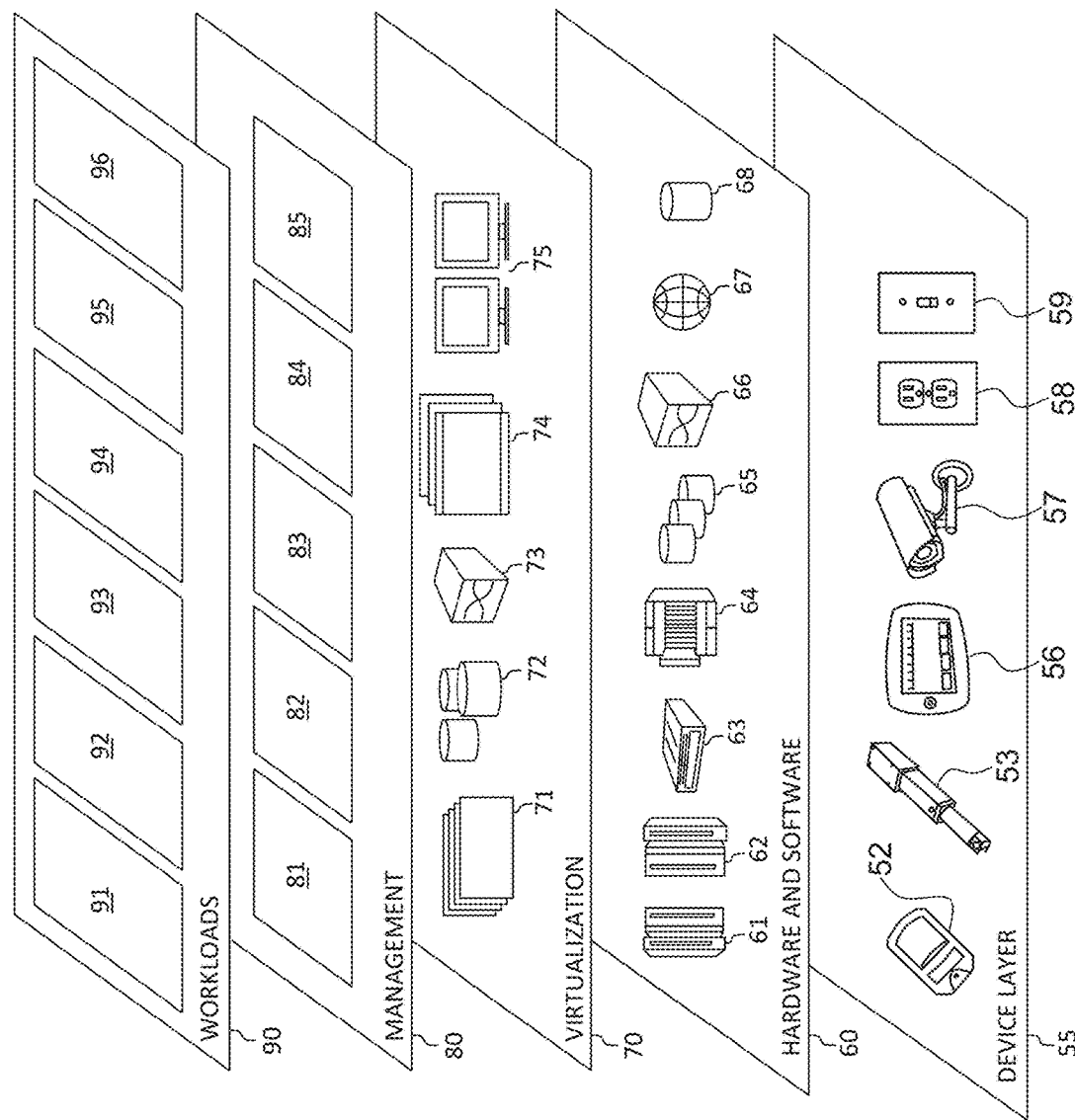
FIG. 3 is an additional block diagram depicting abstraction model layers according to an embodiment of the present invention.

Referring now to FIG. 3, a set of functional abstraction layers provided by cloud computing environment 50 (FIG.

2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator, washer/dryer, or air conditioning unit, and a wide variety of other possible interconnected devices/objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing voice response systems (and/or the operation thereof) as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, in some embodiments described herein, methods and systems are provided for managing voice response systems (or chatbots) and/or the operation thereof such that the systems may be more effectively used in noisy environments and/or environments that include device-generated sounds. In some embodiments, dynamic connections with and/or signals received from noise generating devices are utilized to essentially separate or filter the undesired or background sounds from desired voice communications provided by users. In some embodiments, the chatbot systems may be better able to discern voice commands in environments with excessive unwanted, background noise without the need for the user to silence noise-generating devices, shouting commands, and/or moving closer to the chatbot system (i.e., the microphone utilized by the chatbot).

Figure 4:
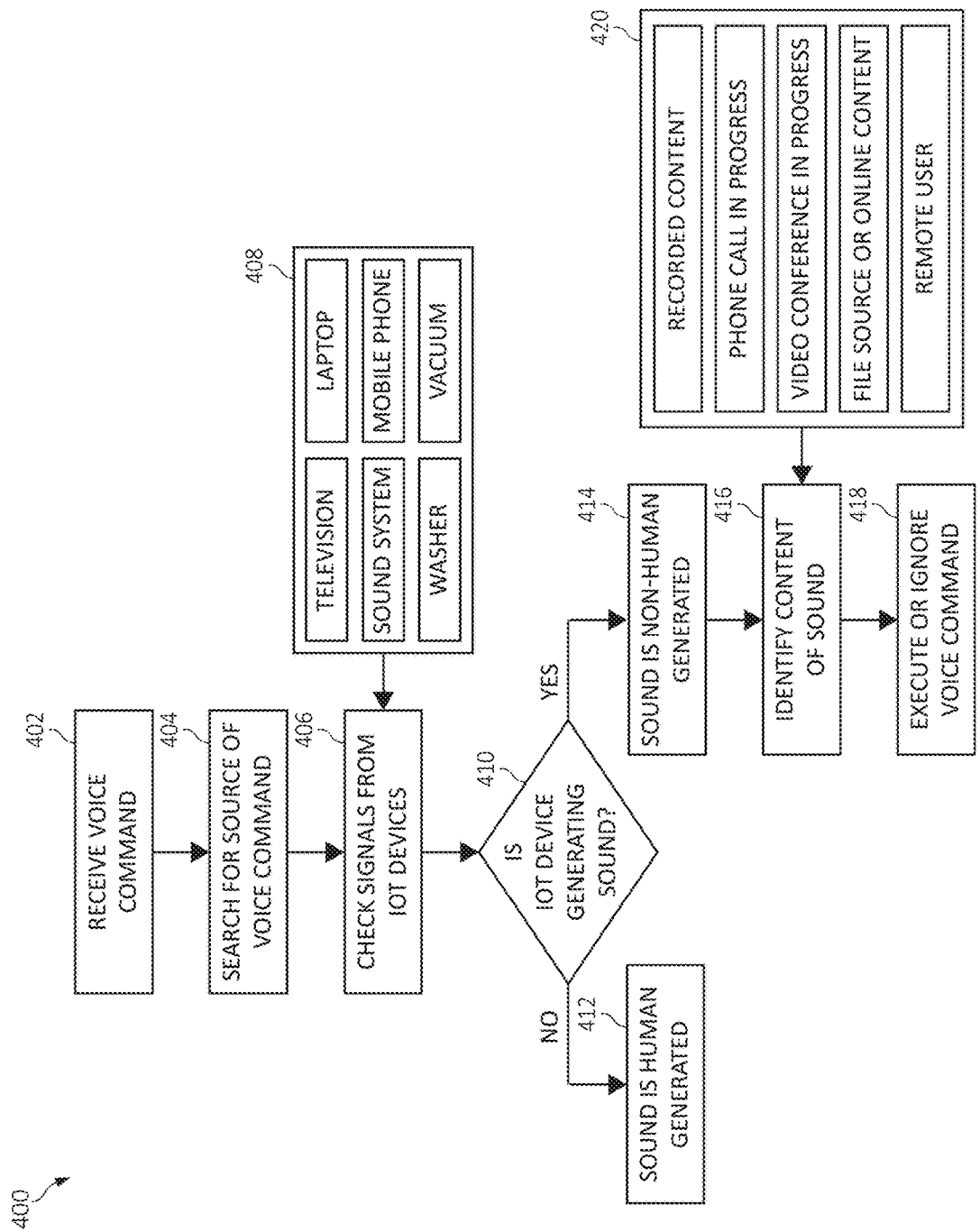
FIG. 4 is a block diagram of an exemplary method and/or system for managing a voice response system according to an embodiment of the present invention.

FIG. 4 illustrate a method (and/or system) 400 for managing a voice response system (or chatbot) and/or voice commands, according to an embodiment of the present invention. At block 402, a sound is detected or received by a chatbot and/or a microphone utilized thereby. The sound may include, for example, a voice command (i.e., a communication or question), or more generally, a human generated sound, or a sound generated by a device of machine, or more generally, a non-human generated sound.

At block 404, the systems searches for (and/or attempts to determine) the source of the sound or voice command (or such a search or determination is initiated). At block 406, the system checks signals received from devices (e.g., IoT devices) in operable communication therewith. Examples of such devices include, for example, television (i.e., "smart" or IoT televisions), laptop computers, sound systems, mobile phones, washers (or washing machines), and vacuum cleaners. At block 410, the system determines whether or not the detected sound (or voice command) is generated by one of the connected devices (e.g., by comparing the received signals from the detected sound, estimation based on the operational state of the devices, etc.).

If it is determined that the sound is not generated by one of the devices, at block 412, the sound is determined to be and/or classified as being human generated (e.g., a spoken/voiced command provided by a user). In such an instance, the system may then analyze the command and execute the appropriate action (e.g., change the operational state of a device, generate an answer to a question, etc.).

If it is determined that the sound is generated by one of the devices, at block 414 the sound is determined to be and/or is classified as being non-human generated. At block 416, the system then identifies (or attempts to identify) the content 420 or type of content 420 in the sound. Examples of content 420 include, for example, recorded content (e.g., being rendered by a sound system, television, computing device, etc.), words/voice content generated from a phone call that is in progress, words/voice content from a video conference that is in progress, words/voice content from a file or online source, words spoken by a remote user, etc.

At block 418, the determination is made whether or not to execute the voice command (if the sound is determined to include one) and/or ignore the command. In situations in which the voice command is determined to be made by a remote user, the determination may be based on the identification of the user (i.e., whether or not the user is authorized to provide voice commands to the system).

Figure 5:
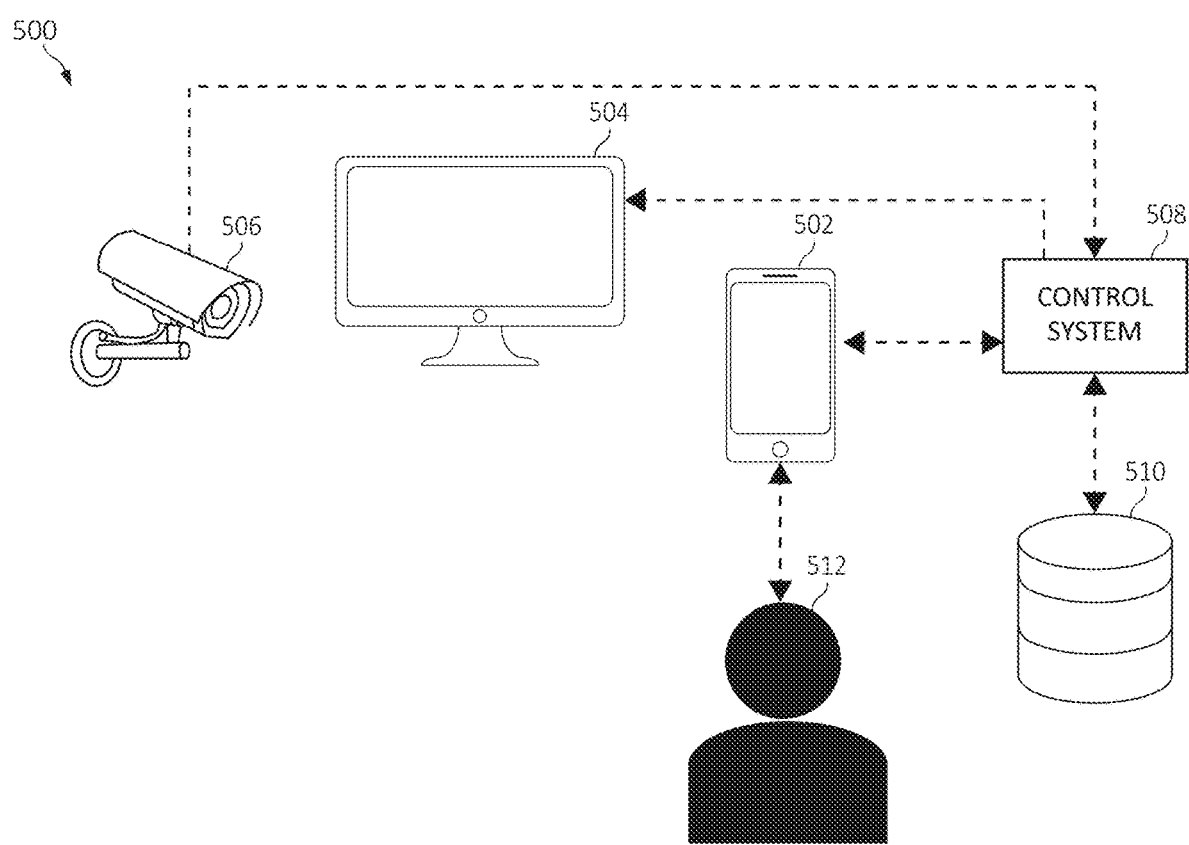
FIG. 5 is a plan view of an exemplary computing environment according to an embodiment of the present invention.

FIG. 5 illustrates an exemplary environment (or system) 500 in which the embodiments described herein may be implemented or utilized. Within (or included within) the environment 500, is a chatbot device 502, an external device 504, a sensor 506, and a control system (or cognitive module) 508. The chatbot device 502 may include any suitable computing device in or through with a chatbot may be implemented or utilized. In the depicted embodiment, the chatbot device 502 includes a mobile electronic device (e.g., a mobile phone). However, in other embodiments, the chatbot device 502 may include other computing devices, such as desktop PCs, tablet devices, dedicated chatbot controllers, etc. Although not shown in detail, the chatbot device 502 includes a microphone.

The external device 504 may be any device or machine that is configured to generate sound and/or noises. Examples include various types of computing devices and appliances (e.g., IoT appliances). In the depicted embodiment, the external device 504 includes a (smart/IoT) television or computing device display. Although not shown in detail, in some embodiments, the external device includes one or more speakers (or electro-acoustic transducers) capable of generating sound, as is commonly understood.

The sensor 506 may include any sensor or sensor array that may be used to detect the presence of an individual or user within the vicinity (e.g., in the same room as the external device 504 and/or the chatbot device 502) and/or determine the activity of such an individual/user. Examples include cameras, microphones, motion sensors, and wireless transceivers (e.g., for detecting the presence of computing devices via wireless communication). Although the sensor 506 is shown as a separate component, in some embodiments, the sensor 506 may be integrated within the chatbot device 502, the external device 504, and/or the cognitive module 508.

The control system 508 may include any suitable computing device, such as those described above, that is configured to perform the management of chatbots and/or the operation thereof described herein. The control system 508 is in operable communication with the chatbot device 502, the external device 504, and the sensor 506. The control system 508 may also be in operable communication with a database 510, on which various types of data may be stored (e.g., previously received voice commands, detected sounds, executed actions, data related to the user(s), etc.). Although the control system 508 is shown as a separate component, the control system 508 may be integrated within the chatbot device 502 and/or the external device 504.

Still referring to FIG. 5, the system 500 may operate and/or be operated in accordance with the aspects of the present invention described herein. For example, a user 512 may generate (or speak) a voice communication (e.g., a voice command or question) that is detected by the chatbot device 502, while, for example, the external device 504 is (also) generating sound/noises, which may include voice content (e.g., lines of dialogue from a movie, song lyrics, etc.). A signal from the external device 504 may be provided to and/or received by the control system 508, which may be representative of the sound/noises generated by the external device 504. The control system 508 may utilize the signal to filter out the sounds created by the external device 504 such that the voice command provided by the user 512 may be (more) easily understood and/or processed. The sensor 506 may be utilized to verify the presence of an individual in the vicinity and/or that the individual is speaking (e.g., via the user's mouth moving).

Also, in situations in which the user 512 does not provide a voice command and/or is not present in the vicinity, but the chatbot device 502 detects spoken words generated by the external device 504, the signal provided by the external device 504 and/or the sensor 506 may be utilized to determine that spoken words should not be considered a voice command, at least in some circumstances. However, as described above, if the external device 504 is being utilized in, for example, a video call, and a remote user taking part in the video call provides a voice command, the signal provided by the external device 504 (and/or information related to the remote user) may be utilized to determine whether or not the voice command should be executed (e.g., if the remote user is authorized). Such functionality may be performed in the presence of other sounds, such as spoken words/voice commands generated by a local user (e.g., user 512) and/or sounds generated by other devices in the vicinity (e.g., a vacuum cleaner).

As such, in some embodiments, the chatbot system (and/or a cognitive module) is connected to various devices and determines if detected sounds are voice commands provided by users in the vicinity or generated by the devices. In some circumstances, the sounds may include voice command generated by remote user's, which may be executed if validated.

In some embodiments, a monitoring engine is utilized. The monitoring engine may be implemented within any utilized device and/or a centralized system (e.g., a control system or cognitive module). The monitoring engine may receive signals from the other devices to determine the sounds (or content) generated by the devices (e.g., the sound of a motor in a vacuum cleaner, dialogue/lyrics from entertainment content, etc.). If the chatbot system determines that the voice command has been provided by a user in the vicinity, or from an authorized user via a video or telephonic conference, the voice command may be executed.

In some embodiments, the contextual situation of the environment is also monitored. For example, if a video or conference call is in progress, a signal provided to the monitoring engine may indicate such and include information about the participants (e.g., whether or not remote users are authorized to provide voice commands). Users may be able to define if remote users' voice commands should be executed (e.g., via a user settings, configuration, or profile).

In some embodiments, NLP content tagging and speech feature extraction is used. For example, during any voice based interaction with the chatbot, the system may track all spoken content in the vicinity and identify which of the content (e.g., voice commands) are related to the chatbot. MFCC speech feature extraction, in conjunction with NLP for keyword processing, may be used for this step.

In some embodiments, an iterative learning mechanism is utilized. For example, a multi-level neural network algorithm may be used to identify types of spoken contents (e.g., a recurrent neural network (RNN) with NLP) that are related to voice commands. For instance, the system may learn to distinguish between normal conversations vs. voice commands provided to the chatbot.

As described above, if the system recognizes a voice command, signals from other devices in the vicinity may be utilized to determine if the command has been generated by another device or a user in the vicinity. As such, machine-to-machine (M2M) communication may be utilized. If the system identifies that detected audio content is from a program or is recorded content, and not from a local user or an authorized user via a video/audio call, the system may not consider the content as a voice command, and thus not execute the command. Ad hoc or Message Queuing Telemetry Transport (MQTT) communication, as are commonly understood, may be used to track activity on other devices (e.g., computing devices) and correlate information that is relayed to the chatbot system.

Figure 6:
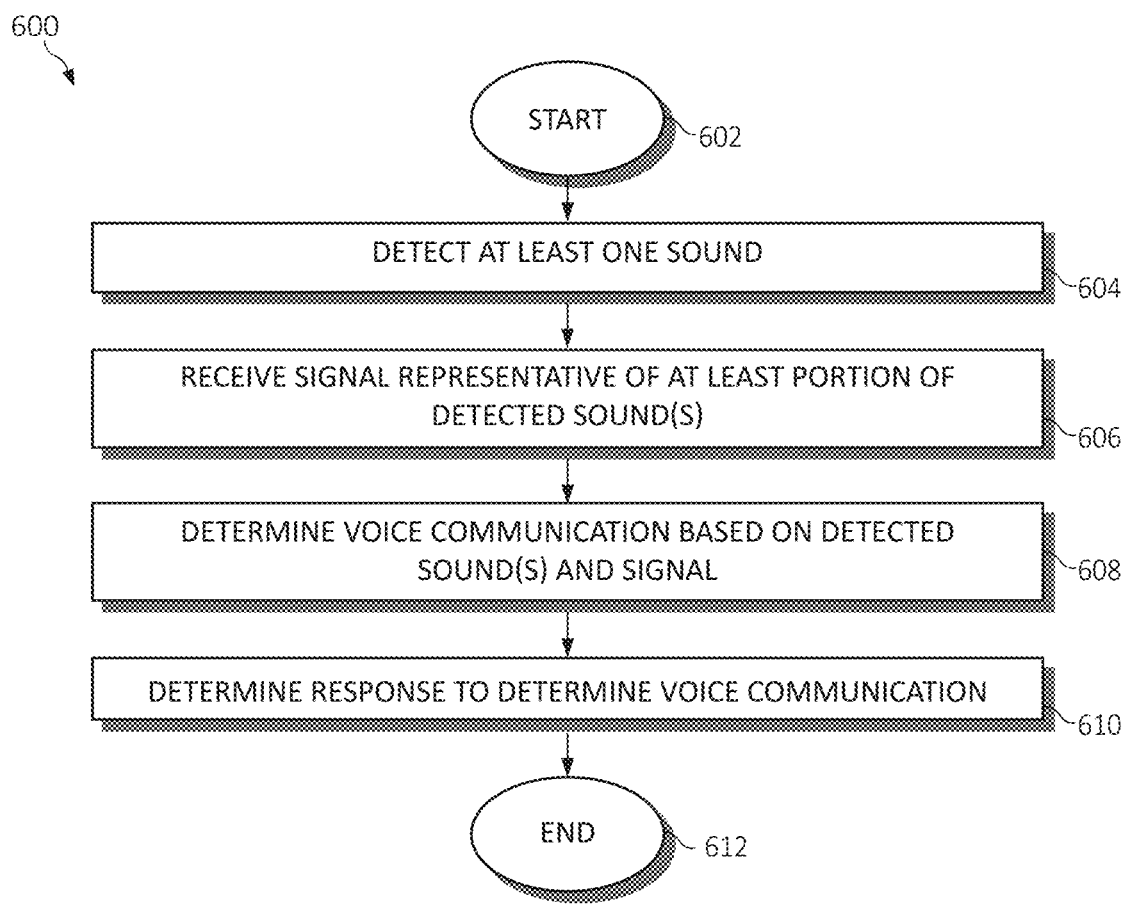
FIG. 6 is a flowchart diagram of an exemplary method for managing a voice response system according to an embodiment of the present invention.

Turning to FIG. 6, a flowchart diagram of an exemplary method 600 for managing voice commands (and/or a voice response system or chatbot), in accordance with various aspects of the present invention, is provided. Method 600 begins (step 602) with, for example, a voice response system being installed (or otherwise implemented) on or through a computing system/device/node, such as a mobile electronic device (e.g., a mobile phone, tablet device, etc.).

At least one sound is detected (step 604). The at least one detected sound may include a human generated sound and/or a non-human generated sound. A detected human generated sound may include a voice communication provided by a user (e.g., locally or remotely). A non-human generated sound may include a sound generated by a device (i.e., a device external to the voice response system) or machine in the vicinity of the voice response system (or more particularly, a microphone utilized thereby), such as a mechanical sound (e.g., a vacuum cleaner or washing machine) or a spoken/voice content (e.g., from a television, music, etc.).

A signal that is representative of at least a portion of the at least one detected sound is received (step 606). The signal and the non-human generated sound may be generated by the external device, and the signal may be representative of the non-human generated sound.

A voice communication is determined based on the at least one detected sound and the signal (step 608). The determining of the voice communication may include filtering the at least one detected sound based on the signal. The at least one detected sound may include a non-human generated sound that includes the determined voice communication.

A response to the determined voice communication is determined (or generated or calculated) (step 610). The response may be caused to be performed by a computing device (or an IoT device). The determined response may include at least one of adjusting the operation of the computing device (e.g., turning off the device) and generating a reply communication to the determined voice communication (e.g., providing an answer to a question).

Method 600 ends (step 612) with, for example, the appropriate action (if any) being performed by the voice response system. The process may be repeated when subsequent sounds are received or detected. In some embodiments, the user(s) may provide feedback related to the management of the chatbot, which may be utilized by the system to improve performance over time.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for managing a voice response system comprising:
   detecting at least one sound by a computing device;
   receiving a signal, by the computing device from an external device, that is representative of at least a portion of the at least one detected sound;
   determining a voice communication based on the at least one detected sound and the signal;
   verifying a veracity of content included in the voice communication by comparing the content of the voice communication in the at least one detected sound to data contained in the signal;
   determining a response to the determined voice communication; and
   causing the determined response to be executed by the computing device.

2. The method of claim 1, wherein the determined response includes at least one of adjusting the operation of the computing device and generating a reply communication to the determined voice communication.

3. The method of claim 1, wherein the at least one detected sound includes a human generated sound and a non-human generated sound.

4. The method of claim 3, wherein the signal and the non-human generated sound are generated by the external device, and the signal is representative of the non-human generated sound.

5. The method of claim 1, wherein the determining of the voice communication includes filtering the at least one detected sound based on the signal.

6. The method of claim 1, wherein the at least one detected sound includes a non-human generated sound that includes the determined voice communication.

7. A system for managing a voice response system comprising:
   an external device; and
   a computing device having at least one processor that
       detects at least one sound by the computing device;
       receives a signal, by the computing device from the external device, that is representative of at least a portion of the at least one detected sound;
       determines a voice communication based on the at least one detected sound and the signal;
       verifies a veracity of content included in the voice communication by comparing the content of the voice communication in the at least one detected sound to data contained in the signal;
       determines a response to the determined voice communication; and
       causes the determined response to be executed by the computing device.

8. The system of claim 7, wherein the determined response includes at least one of adjusting the operation of the computing device and generating a reply communication to the determined voice communication.

9. The system of claim 7, wherein the at least one detected sound includes a human generated sound and a non-human generated sound.

10. The system of claim 9, wherein the signal and the non-human generated sound are generated by the external device, and the signal is representative of the non-human generated sound.

11. The system of claim 7, wherein the determining of the voice communication includes filtering the at least one detected sound based on the signal.

12. The system of claim 7, wherein the at least one detected sound includes a non-human generated sound that includes the determined voice communication.

13. A computer program product for managing a voice response system by one or more processors, the computer program product comprising a non-transitory computer-readable storage medium having computer-readable program code portions stored therein, the computer-readable program code portions comprising:

an executable portion that detects at least one sound by a computing device;

an executable portion that receives a signal, by the computing device from an external device, that is representative of at least a portion of the at least one detected sound;

an executable portion that determines a voice communication based on the at least one detected sound and the signal;

an executable portion that verifies a veracity of content included in the voice communication by comparing the content of the voice communication in the at least one detected sound to data contained in the signal;

an executable portion that determines a response to the determined voice communication; and an executable portion that causes the determined response to be executed by the computing device.

14. The computer program product of claim 13, wherein the determined response includes at least one of adjusting the operation of the computing device and generating a reply communication to the determined voice communication.

15. The computer program product of claim 13, wherein the at least one detected sound includes a human generated sound and a non-human generated sound.

16. The computer program product of claim 15, wherein the signal and the non-human generated sound are generated by the external device, and the signal is representative of the non-human generated sound.

17. The computer program product of claim 13, wherein the determining of the voice communication includes filtering the at least one detected sound based on the signal.

18. The computer program product of claim 13, wherein the at least one detected sound includes a non-human generated sound that includes the determined voice communication.

* * * * *